(12) United States Patent
Choi et al.

(10) Patent No.: US 12,219,077 B2
(45) Date of Patent: Feb. 4, 2025

(54) ELECTRONIC DEVICE INCLUDING HOUSING

(71) Applicant: Samsung Electronics Co., Ltd., Gyeonggi-do (KR)

(72) Inventors: Byounghee Choi, Gyeonggi-do (KR); Sooncheol Kwon, Gyeonggi-do (KR); Yoonsik Kim, Gyeonggi-do (KR); Jungchul Kim, Gyeonggi-do (KR); Jinho Lee, Gyeonggi-do (KR); Youngsoo Jeong, Gyeonggi-do (KR); Youngsoo Ha, Gyeonggi-do (KR); Yongwook Hwang, Gyeonggi-do (KR); Junghyeon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 17/697,140

(22) Filed: Mar. 17, 2022

(65) Prior Publication Data
US 2022/0303372 A1     Sep. 22, 2022

Related U.S. Application Data

(63) Continuation of application No. PCT/KR2022/003291, filed on Mar. 8, 2022.

(30) Foreign Application Priority Data

Mar. 17, 2021 (KR) .......................... 10-2021-0034612

(51) Int. Cl.
*H04M 1/02* (2006.01)
*G02F 1/1335* (2006.01)
*G06F 1/16* (2006.01)

(52) U.S. Cl.
CPC .... *H04M 1/0249* (2013.01); *G02F 1/133512* (2013.01); *G06F 1/1637* (2013.01); *H04M 1/0266* (2013.01); *H04M 2201/38* (2013.01)

(58) Field of Classification Search
CPC .................................................. H04M 1/0249
See application file for complete search history.

(56) References Cited

U.S. PATENT DOCUMENTS 10,444,889 B2   10/2019   Chang et al.
10,972,591 B2    4/2021   Im et al.
(Continued)

FOREIGN PATENT DOCUMENTS

EP     3 396 931 B1    6/2020
JP     2012-199773 A  10/2012
(Continued)

OTHER PUBLICATIONS

International Search Report Dated Jul. 6, 2022.

*Primary Examiner* — Hsinchun Liao
(74) *Attorney, Agent, or Firm* — Cha & Reiter, LLC

(57) ABSTRACT

An electronic device is disclosed, including a window including a front surface facing an outer surface of the electronic device, a rear surface facing an opposite direction to the front surface, and a side surface extending from an edge of the front surface to an edge of the rear surface, a housing, in which the window is seated, a display disposed between the window and the housing. The housing includes a first surface covered by the window, a second surface extending from the first surface that is visible from an exterior of the electronic device, a conductive part and a nonconductive part, together defining the first surface and the second surface, wherein the first surface and the second surface of the housing have different levels of gloss.

15 Claims, 10 Drawing Sheets

(56) References Cited

U.S. PATENT DOCUMENTS

| | | | |
|---|---|---|---|
| 11,157,040 B2 | 10/2021 | Hwang et al. | |
| 11,503,143 B2 | 11/2022 | Kallman et al. | |
| 11,522,983 B2 | 12/2022 | Bates et al. | |
| 2007/0116916 A1 | 5/2007 | Ito et al. | |
| 2018/0181234 A1* | 6/2018 | Hammura | G06F 3/0446 |
| 2019/0364674 A1* | 11/2019 | Matsuyuki | B24C 1/04 |
| 2020/0358890 A1 | 11/2020 | Im et al. | |
| 2021/0168231 A1* | 6/2021 | Baker | H05K 1/189 |
| 2023/0018308 A1 | 1/2023 | Kallman et al. | |

FOREIGN PATENT DOCUMENTS

| | | |
|---|---|---|
| JP | 2018-45053 A | 3/2018 |
| KR | 10-1097028 B1 | 12/2011 |
| KR | 10-2016-0029569 A | 3/2016 |
| KR | 10-2018-0076443 A | 7/2018 |
| KR | 10-2020-0130020 A | 11/2020 |
| KR | 10-2021-0069596 A | 6/2021 |

\* cited by examiner

ELECTRONIC DEVICE INCLUDING HOUSING

CROSS-REFERENCE TO RELATED APPLICATION(S)

This application is a continuation of International Application No. PCT/KR2022/003291 filed on Mar. 8, 2022, which claims priority to Korean Patent Application No. 10-2021-0034612, filed on Mar. 17, 2021 in the Korean Intellectual Property Office, the disclosures of which are herein incorporated by reference.

TECHNICAL FIELD

Embodiments disclosed in the disclosure relate to an electronic device including a housing, and more particularly, to preventing light leakage from an interior of the electronic device.

BACKGROUND

An electronic device may include a display for providing visual information to a user, a transparent window disposed on the display to protect the display, and a housing for accommodating both display, window and other operational components of the device.

Various materials may be applied to the housing to create a pleasing aesthetic for the external appearance of the electronic device. For example, visual and tactile features such as high glossiness and metallic textures may be created by applying a metallic material to the housing.

In some situations, light generated in an interior of the electronic device becomes incident to the housing, and is thus visible to the user. For example, a portion of the light emitted from the display may fail to pass through a window thereof, and instead, becomes reflected and/or refracted in the window and reaches the housing. In this case, the housing thus reflects light emitted by the display. This causes light leakage at an unintended portion of the device, such as, for example, an joint between the window and the housing. As a result, the aesthetic appeal of the device may be degraded.

SUMMARY

An aspect of the disclosure may provide a housing that prevents light-leakage, and an electronic device including the housing preventing light-leakage.

According to an aspect of the disclosure, an electronic device may include: a window including a front surface facing an outer surface of the electronic device, a rear surface facing an opposite direction to the front surface, and a side surface extending from an edge of the front surface to an edge of the rear surface, a housing, in which the window is seated, a display disposed between the window and the housing, wherein the housing includes a first surface covered by the window, a second surface extending from the first surface that is visible from an exterior of the electronic device, a conductive part and a nonconductive part, together defining the first surface and the second surface, wherein the first surface and the second surface of the housing have different levels of gloss.

According to another aspect of the disclosure, an electronic device may include: a window including a front surface facing an outer surface of the electronic device, a rear surface facing an opposite direction to the front surface, and a side surface extending from an edge of the front surface to an edge of the rear surface, the window being substantially transparent, a housing in which the window is seated, a display disposed between the window and the housing, on the rear surface of the window, a light shielding layer at least partially surrounding a periphery of the display, and disposed on the rear surface of the window, wherein the housing includes: a first surface covered by the window, a second surface extending from the first surface so as to be visible from an exterior of the electronic device, a conductive part and a nonconductive part together defining the first surface and the second surface, wherein a roughness level of the first surface is different from a roughness level of the second surface of the housing According to the embodiments of the disclosure, light that is generated in the interior of the electronic device may be prevented from leaking out to an external environment.

According to the embodiments of the disclosure, the external appearance of the electronic device may be improved aesthetically, while simultaneously preventing leakage of the light from the interior of the electronic device, through a housing which may have surfaces, each with different degrees of roughness/smoothness.

According to the embodiments of the disclosure, mechanical/chemical characteristics (e.g., anti-wear and anti-corrosion) may be enhanced for a housing, while preventing leakage of light generated in an interior of the electronic device. Furthermore, the housing may include surfaces with different roughness levels, and additionally, an oxide film may be formed thereon.

In addition, the disclosure may provide various effects that are directly or indirectly recognized.

DESCRIPTION OF DRAWINGS

With regard to description of drawings, the same or similar components may be marked by the same or similar reference numerals.

DETAILED DESCRIPTION

Hereinafter, certain embodiments of the disclosure will be described with reference to the accompanying drawings. Accordingly, those of ordinary skill in the art will recognize that modification, equivalent, and/or alternative on the certain embodiments described herein can be variously made without departing from the scope of the disclosure.

Figure 1A:
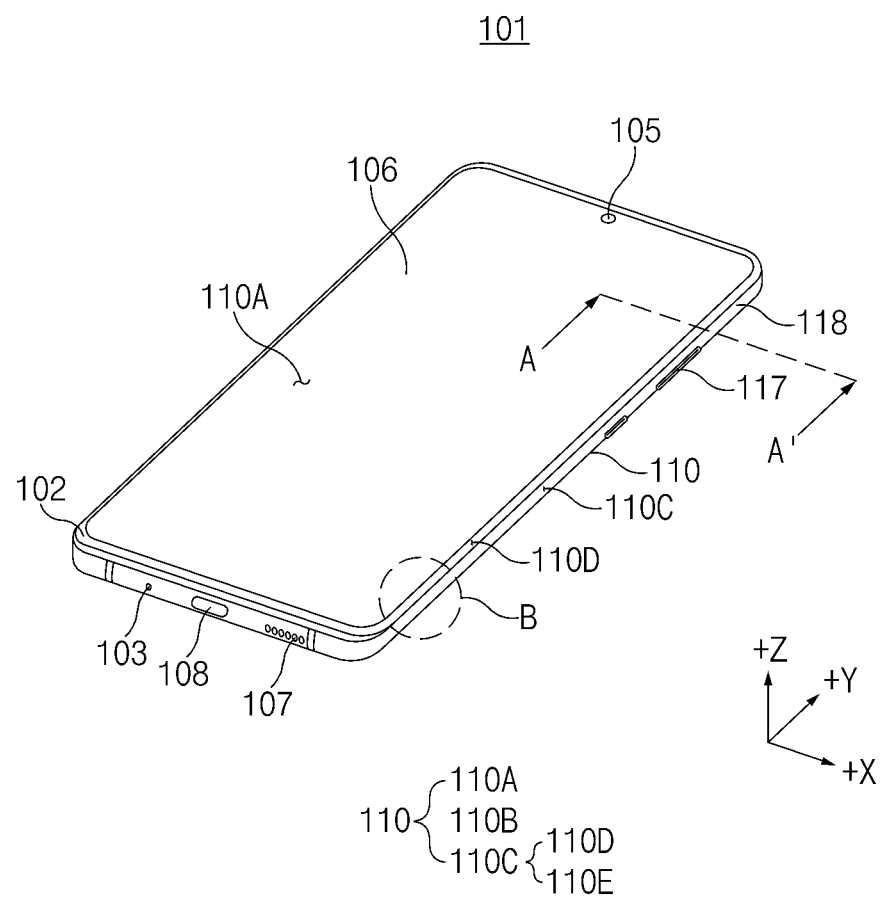
FIG. 1A is a front perspective view of an electronic device according to an embodiment.

FIG. 1A is a front perspective view of an electronic device according to an embodiment.

Figure 1B:
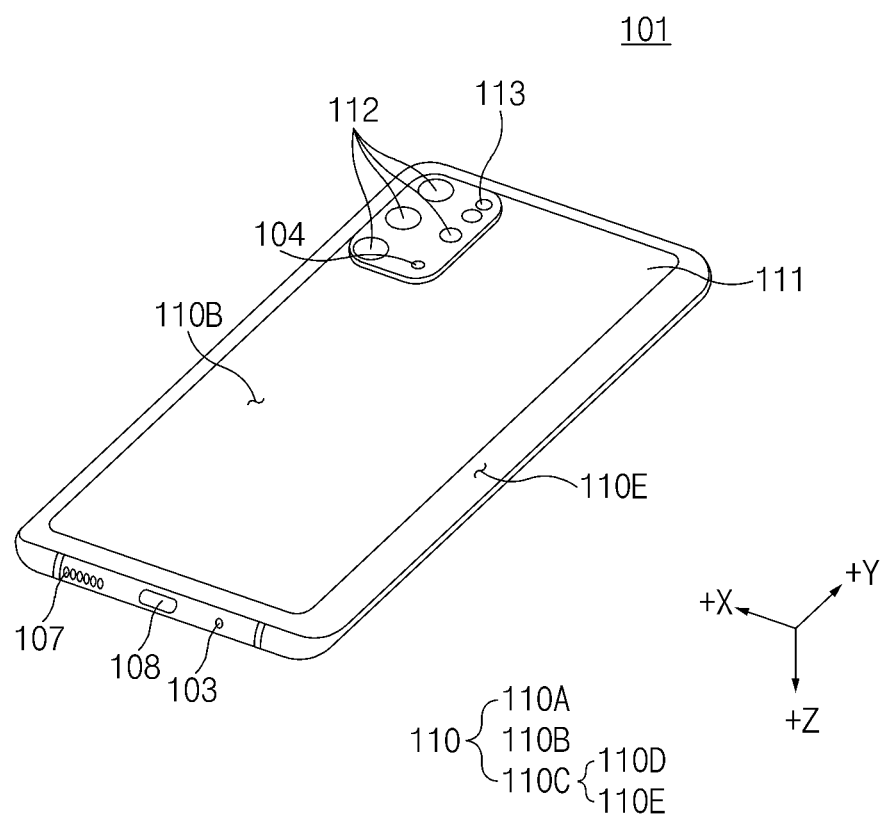
FIG. 1B is a rear perspective view of an electronic device according to an embodiment.

FIG. 1B is a rear perspective view of an electronic device according to an embodiment.

Referring to FIGS. 1A and 1B, an electronic device 101 may include a housing 110, which may include a first surface (or a front surface) 110A, a second surface (or a rear surface) 110B, and a side surface 110C that surrounds a space defined between the first surface 110A and the second surface 110B.

In another embodiment (not illustrated), the housing 110 may include a structure that defines some of the first surface 110A, the second surface 110B, and the side surface 110C.

In an embodiment, the first surface 110A may be defined by a front plate 102, at least a portion of which may be substantially transparent. In an embodiment, the front plate 102, for example, may include a glass plate or a polymer plate. The front plate 102 may further include various coating layers.

In an embodiment, the second surface 110B may be defined by a substantially opaque rear plate 111. The rear plate 111, for example, may be formed of coated or colored glass, ceramics, a polymer, a metal (e.g., aluminum, stainless steel (STS), or magnesium), or a combination of at least two thereof. The side surface 110C may be coupled to the front plate 102 and the rear plate 111, and may be defined by a side bezel structure (or 'a frame structure') 118 which may also include a metal and/or a polymer.

In another embodiment, the rear plate 111 and the side bezel structure 118 may be integrally formed, and may include the same material (e.g., a metallic material such as aluminum).

In the illustrated embodiment, the front plate 102 may include two first areas 110D that are deflected from a partial area of the first surface 110A toward the rear plate 111, and which further extend seamlessly therefrom. The first areas 110D may be located at opposite ends of a long edge of the front plate 102.

In the illustrated embodiment, the rear plate 111 may include two second areas 110E that are deflected from a partial area of the second surface 110B toward the front plate 102, and also extend seamlessly. The second areas 110E may be included at opposite ends of a long edge of the rear plate 111.

In an embodiment, the front plate 102 (or the rear plate 111) may include one of the first areas 110D (or the second areas 110E). Furthermore, in another embodiment, the front plate 102 (or the rear plate 111) may not omit some of the first areas 110D (or the second areas 110E). In this case, the front plate 102 and/or the rear plate 111 may be formed to be substantially flat.

In an embodiment, when viewed from a side of the electronic device 101, the side bezel structure 118 may have a first thickness (width) on a lateral side (e.g., a short edge), on which neither the first areas 110D nor the second areas 110E are included, and may have a second thickness that is smaller than the first thickness on a lateral side (e.g., a long edge), on which the first areas 110D or the second areas 110E are included.

Figure 8:
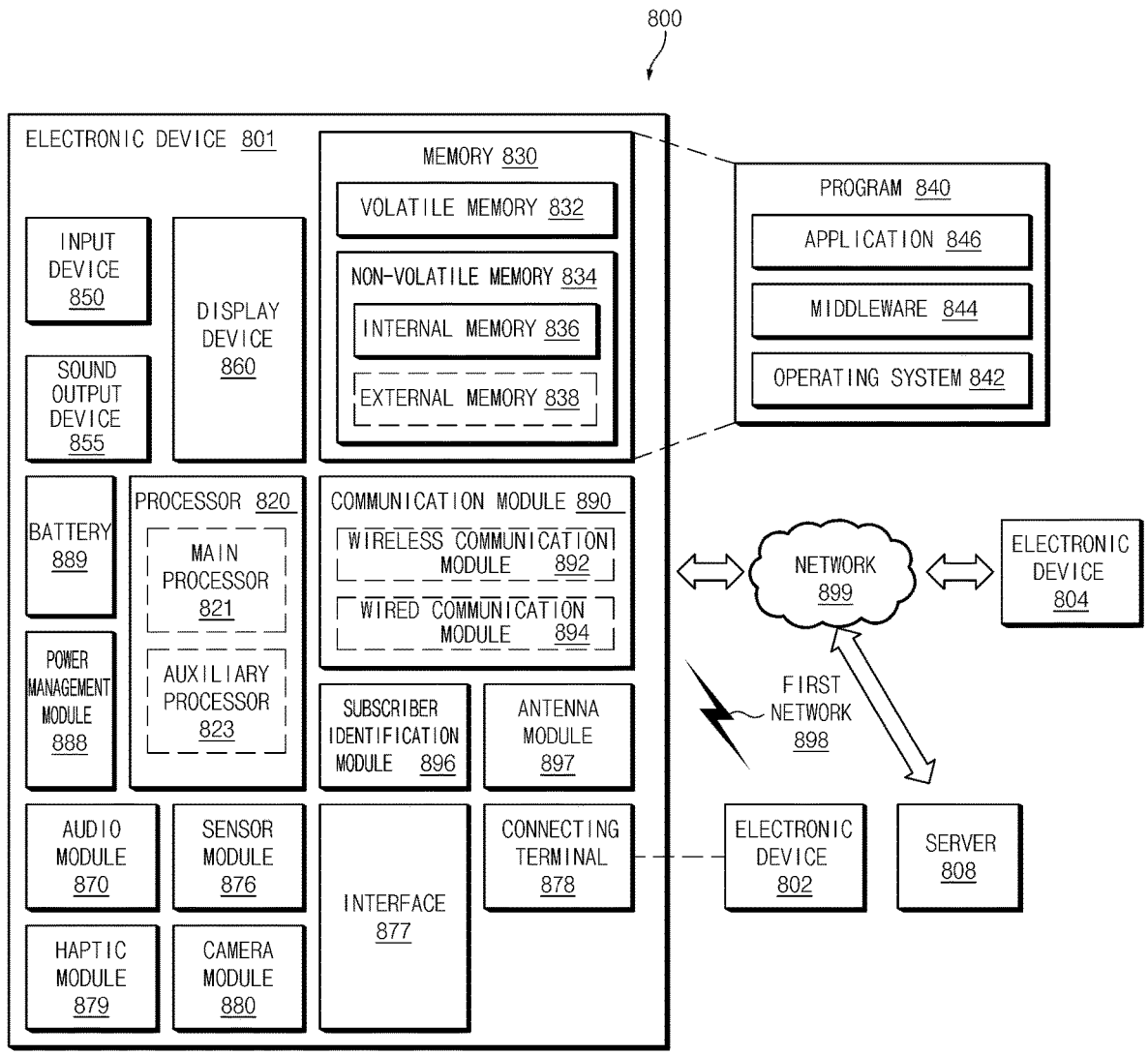
FIG. 8 is a block diagram of an electronic device in a network environment according to certain embodiments.

In an embodiment, the electronic device 101 may include at least one of a display 106, audio modules 103 and 107 (e.g., an audio module 870 of FIG. 8), a sensor module (not illustrated) (e.g., a sensor module 876 of FIG. 8), camera modules 105, 112, and 113 (e.g., a camera module 880 of FIG. 8), a key input device 117 (e.g., an input module 850 of FIG. 8), a light emitting element (not illustrated), and a connector hole 108 (e.g., a connection terminal 878 of FIG. 8). In another embodiment, at least one (e.g., the key input device 117 or the light emitting element (not illustrated)) of the elements may be omitted from the electronic device 101 or another component may be additionally included in the electronic device 101.

In an embodiment, the display 106 may be exposed through a corresponding portion of the front plate 102. For example, at least a portion of the display 106 may be exposed through the front plate 102 that defines the first surface 110A, and the first areas 110D of the side surface 110C.

In an embodiment, corners of the display 106 may be formed as a shape that is substantially the same as the adjacent outer shape of the front plate 102. In other embodiments (not illustrated), in order to expand the area, by which the display 106 is exposed, the intervals between the outskirts of the display 106 and the outskirts of the front plate 102 may be substantially the same.

In an embodiment, a surface (or the front plate 102) of the housing 110 may include a screen display area that is formed as the display 106, which may be visually exposed to an exterior of the device. For example, the screen display area may include the first surface 110A, and the first areas 110D of the side surface.

In another embodiment (not illustrated), the screen display areas 110A and 110D may include a sensing area (not illustrated) configured to acquire biometric information of a user. Here, the expression "the screen display areas 110A and 110D include a sensing area" may be understood that at least a portion of the sensing area may overlap the screen display areas 110A and 110D. For example, the sensing area (not illustrated) may display visual information on the display 106 like other areas of the screen display areas 110A and 110D, and additionally, may indicate an area that may acquire biometric information (e.g., a fingerprint) of the user.

In another embodiment, the screen display areas 110A and 110D of the display 106 may include an area, in which the first camera module 105 (e.g., a punch hole camera) may be visually exposed. For example, at least a portion of an edge of an area, through which the first camera module 105 is exposed, may be surrounded by the screen display areas 110A and 110D. In an embodiment, the first camera module 105 may include a plurality of camera modules (e.g., a camera module 880 of FIG. 8).

In other embodiments (not illustrated), the display 106 may be coupled to or be disposed to be adjacent to a touch detection circuit, a pressure sensor that may measure the strength (the pressure) of a touch, and/or a digitizer that detects a stylus pen of a magnetic field type.

According to an embodiment, the audio modules 103, 104, and 107 may include the microphone holes and the speaker hole.

In an embodiment, the microphone holes may include the first microphone hole formed in a partial area of the side surface 110C, and the second microphone hole formed in a partial area of the second surface 110B. Microphones for obtaining external sound may be disposed in interiors of the microphone holes. The microphones may include a plurality of microphones to sense a direction of sound. In an embodiment, the second microphone hole formed in a partial area of the second surface 110B may be disposed to be adjacent to the camera modules 105, 112, and 113. For example, the second microphone hole may acquire sound during execution of the camera modules 105, 112, and 113, or may acquire sound during execution of another function.

In an embodiment, the speaker hole may include the external speaker hole and a communication receiver hole (not illustrated). The external speaker hole may be formed at a portion of the side surface 110C of the electronic device 101. In another embodiment, the external speaker hole and the microphone hole may be implemented with one hole. Although not illustrated, the communication receiver hole (not illustrated) may be formed at another portion of the side surface 110C. For example, the communication receiver hole (not illustrated) may be formed at a portion (e.g., a portion that faces the +Y axis direction) of the side surface 110C, which faces a portion (e.g., a portion that faces the −Y axis direction) of the side surface 110C, at which the external speaker hole is formed.

In an embodiment, the electronic device 101 may include a speaker communicated with the speaker hole. In another embodiment, the speaker may include a piezoelectric speaker, from which the speaker hole is omitted.

In an embodiment, the sensor module (not illustrated) (e.g., the sensor module 876 of FIG. 8) may generate an electrical signal or a data value corresponding to an operation state of the interior of the electronic device 101 or an environmental state of the outside. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illumination sensor.

In an embodiment, the camera modules 105, 112, and 113 may include the first camera module 105 (e.g., the punch hole camera) exposed through the first surface 110A of the electronic device 101, and the second camera module 112 and/or the flash exposed through the second surface 110B.

In an embodiment, the first camera module 105 may be exposed through a portion of the screen display areas 110A and 110D of the display 106. For example, the first camera module 105 may be exposed through a partial area of the screen display areas 110A and 110D through an opening (not illustrated) formed at a portion of the display 106.

In an embodiment, the second camera module 112 may include a plurality of camera modules (e.g., a dual camera, a triple camera, or a quad camera). However, the second camera module 112 is not limited to necessarily include a plurality of camera modules, and may include one camera module.

The first camera modules 105 and the second camera module 112 may include one or a plurality of lenses, an image sensor, and/or an image signal processor. The flash, for example, may include a light emitting diode or a xenon lamp. In another embodiment, two or more lenses (an infrared ray camera, and a wide angle/telephoto lens), and image sensors may be disposed on one surface of the electronic device 101.

In an embodiment, the key input device 117 may be disposed in the side surface 110C (e.g., the first areas 110D and/or the second areas 110E) of the housing 110. In another embodiment, the electronic device 101 may not omit some or all of the above-mentioned key input devices 117 and the key input devices 117 which are omitted, may be realized in different forms, such as a soft key, on the display 106. In another embodiment, the key input device may include a sensor module (not illustrated) that defines a sensing area (not illustrated) included in the screen display areas 110A and 110D.

In an embodiment, the connector hole 108 may accommodate connectors. The connector hole 108 may be disposed on the side surface 110C of the housing 110. For example, the connector hole 108 may be disposed on the side surface 110C to be adjacent to at least a portion of the audio modules (e.g., the microphone hole and the speaker hole). In another embodiment, the electronic device 101 may include the first connector hole 108 that may accommodate a connector (e.g., a USB connector) for transmitting and receiving electric power and/or data to and from an external electronic device and/or a second connector hole (not illustrated) that may accommodate a connector (e.g., an earphone jack) for transmitting and receiving an audio signal to and from the external device.

In an embodiment, the electronic device 101 may include a light emitting element (not illustrated). For example, the light emitting element (not illustrated) may be disposed on the first surface 110A of the housing 110. The light emitting element (not illustrated) may provide state information on the electronic device 101 in the form of light. In another embodiment, the light emitting element (not illustrated) may provide a light source that interworks with an operation of the first camera module 105. For example, the light emitting element (not illustrated) may include an LED, an IR LED, and/or a xenon lamp.

Figure 1C:
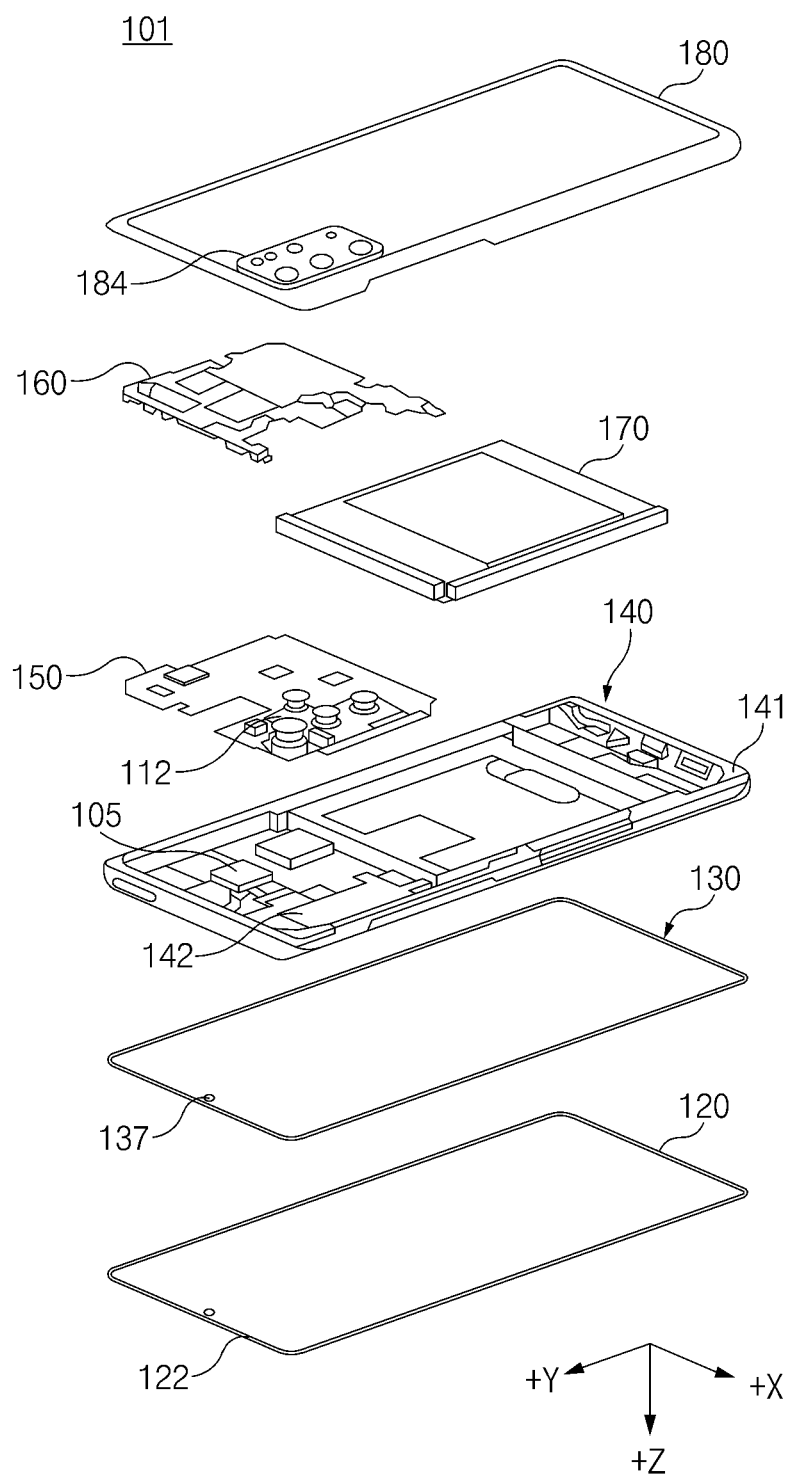
FIG. 1C is an exploded perspective view of an electronic device according to an embodiment.

FIG. 1C is an exploded perspective view of an electronic device according to an embodiment.

Referring to FIG. 1C, the electronic device 101 may include a front plate 120 (e.g., the front plate 102 of FIG. 1A), a display 130 (e.g., the display 106 of FIG. 1A), a light shielding layer 122, a bracket 140, a battery 170, a printed circuit board 150, a support member 160 (e.g., a rear case), and a rear plate 180 (e.g., the rear plate 111 of FIG. 1B).

In another embodiment, at least one (e.g., the support member 160) of the elements may be omitted from the electronic device 101 or another component may be additionally included in the electronic device 101. At least one of the components of the electronic device 101 may be the same as or similar to at least one of the components of the electronic device 101 of FIGS. 1A and 1B, and a repeated description thereof will be omitted.

In an embodiment, a least some of the front plate 120, the rear plate 180, and the bracket 140 may define the housing (e.g., the housing 110 of FIGS. 1A and 1B).

In an embodiment, the front plate 120 may be seated on one side (e.g., the +Z direction) of the bracket 140. In an embodiment, the display 130 may be disposed between the front plate 120 and the bracket 140. In an embodiment, the rear plate 180 may be seated on an opposite side (e.g., the −Z direction) of the bracket 140.

In an embodiment, the bracket 140 may include a frame structure 141 (e.g., the side bezel structure 118 of FIG. 1A) that defines a surface (e.g., a portion of the side surface 110C of FIG. 1A) of the electronic device 101, and a plate structure 142 that extends from the frame structure 141 to an inside of the electronic device 101.

In an embodiment, the plate structure 142 may be located in an interior of the electronic device 101, may be connected to the frame structure 141, or may be integrally formed with the frame structure 141. The plate structure 142, for example, may be formed of a metallic material and/or a nonmetallic material (e.g., a polymer). The display 130 may be coupled to one surface of the plate structure 142, and the printed circuit board 150 may be coupled to an opposite surface of the plate structure 142. A processor, a memory, and/or an interface may be mounted on the printed circuit board 150. The processor, for example, may include one or more of a central processing unit, an application processor, a graphic processing unit, an image signal processor, a sensor hub processor, or a communication processor.

The memory, for example, may include a volatile and/or nonvolatile memory.

The interface, for example, may include a high definition multimedia interface (HDMI), a universal serial bus (USB), an SD card interface, and/or an audio interface. The interface, for example, may electrically or physically connect the electronic device 101 to an external device, and may include a USB connector, an SD card/MMC connector, and an audio connector.

In an embodiment, the battery 170 may supply electric power to at least one of the elements of the electronic device 101. For example, the battery 170 may include a primary cell that cannot be recharged, a rechargeable secondary cell, or a fuel cell. In an embodiment, the battery 170 may be disposed to be at least partially accommodated in a space defined by the bracket 140. In an embodiment, at least a portion of the battery 170 may be disposed on a plane that is substantially the same as that of the printed circuit board 150. In an embodiment, the battery 170 may be integrally disposed in the interior of the electronic device 101 or may be disposed to be attached to or detached from the electronic device 101.

In an embodiment, the first camera module 105 may be disposed in the plate structure 142 of the bracket 140 such that the lens is exposed through a partial area of the front plate 120 (or the front surface 110A of FIG. 1A) of the electronic device 101.

In an embodiment, the first camera module 105 may be disposed such that an optical axis of the lens is at least partially aligned with a hole or a recess 137 formed in the display 130. For example, an area, in which the lens is exposed, may be formed in the front plate 120. For example, the first camera module 105 may include a punch hole camera disposed in an interior of the hole or the recess 137 formed on the rear surface of the display 130.

In an embodiment, the second camera module 112 may be disposed in the printed circuit board 150 such that the lens is exposed through a camera area 184 of the rear plate 180 (or the rear surface 110B of FIG. 1B) of the electronic device 101.

In an embodiment, the camera area 184 may be formed on a surface (e.g., the rear surface 110B of FIG. 1B) of the rear plate 180. In an embodiment, the camera area 184 may be formed to be at least transparent such that external light is input to the lens of the second camera module 112. In an embodiment, at least a portion of the camera area 184 may protrude from the surface of the rear plate 180 by a specific height. However, the embodiment is not limited thereto, and the camera area 184 may define a plane that is substantially the same as the surface of the rear plate 180.

In an embodiment, the light shielding layer 122 may be disposed on the rear surface (e.g., a surface that faces the −Z direction) of the front plate 120. For example, the light shielding layer 122 may be disposed on a surface of the front plate 120, which faces the display 130. In an embodiment, the light shielding layer 122 may be formed in a shape that at least a partially surrounds an edge of the display 130. In an embodiment, the light shielding layer 122 may at least partially overlap the display 130 to cover a non-display area of the display 130, which may be viewed from an exterior, through the transparent front plate 120. For example, the portion of the light shielding layer 122, which overlaps the display 130, may be disposed between the front plate 120 and the display 130. In an embodiment, the light shielding layer 122 may cover a portion of the bracket 140, which may be viewed from the exterior through the transparent front plate 120, as well as the non-display area of the display 130. To achieve this, the light shielding layer 122 may extend from an edge portion of the display 130 to an edge portion of the front plate 120. In an embodiment, the shape of the light shielding layer 122 is not limited to the illustrated example, and various modifications in design may be made according to the shape of the front plate 120, the display 130, and/or the bracket 140.

Figure 2:
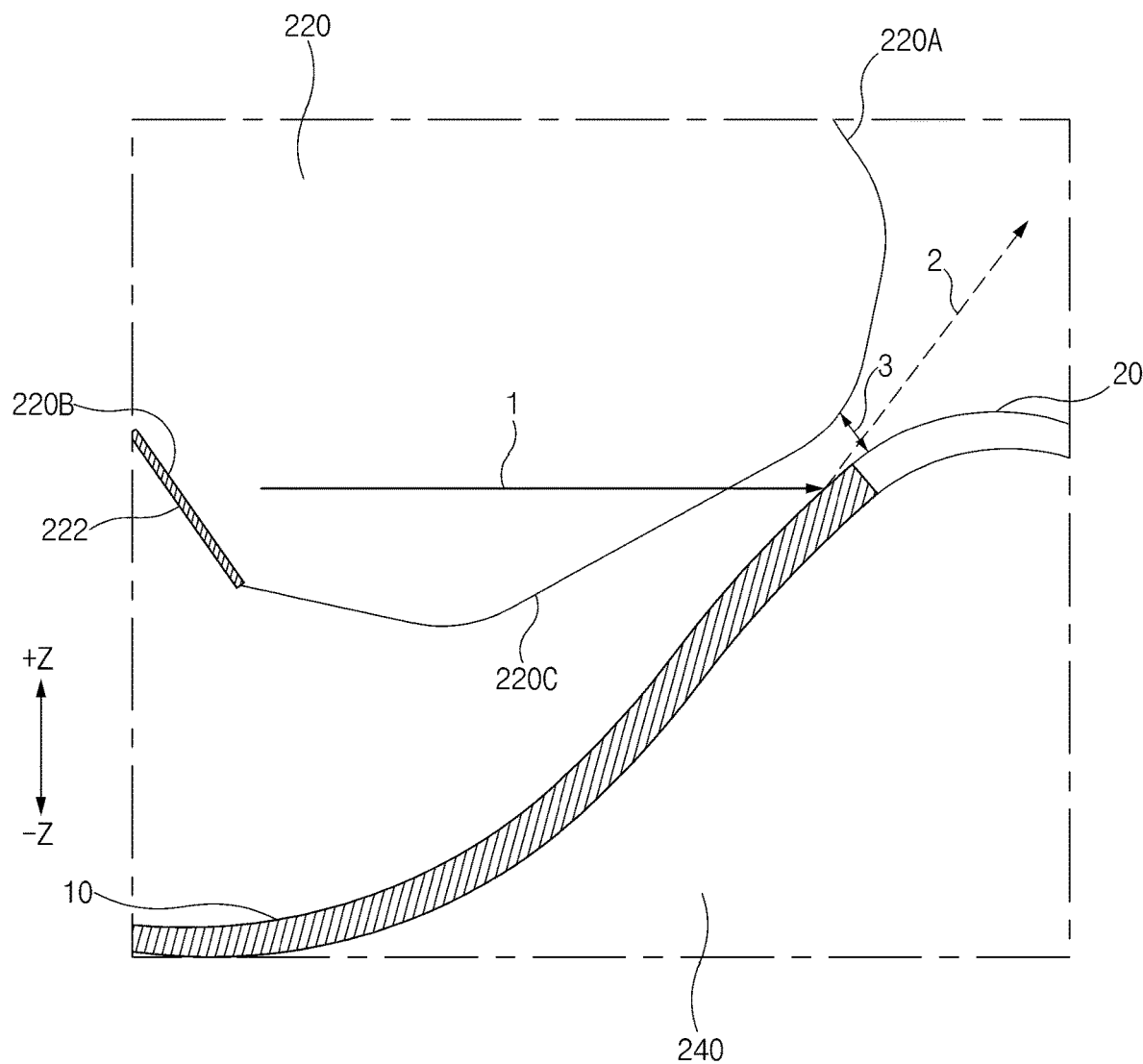
FIG. 2 is a cross-sectional view of a main part of line A-A' of FIG. 1A.

FIG. 2 is a cross-sectional view of a main part of line A-A' of FIG. 1A.

In FIG. 2, for convenience of description, it is illustrated that a first surface 10 and a second surface 20 of a housing 240 have specific thicknesses, but the disclosure is not limited thereto.

Referring to FIG. 2, the electronic device 101 according to an embodiment may include the housing 240, a window 220 seated in the housing 240, and a light shielding layer 222. In an embodiment, the housing 240 may correspond to the bracket 140 of FIG. 1C or the frame structure 141 of the bracket 140, and the window 220 may correspond to the front plate 120 of FIG. 1C.

In an embodiment, the housing 240 may include the first surface 10 and the second surface 20. In an embodiment, the first surface 10 of the housing 240 may be located under the window 220 (e.g., the −Z direction). In an embodiment, the first surface 10 may be covered by the window 220. For example, the first surface 10 may at least partially overlap the window 220 when the window 220 is viewed from a front side (for example, the window 220 is viewed in the −Z direction). In an embodiment, the first surface 10 may be covered by the window 220 so as not to be exposed to the exterior environment of the electronic device 101. In an embodiment, the first surface 10 may not be visible from the exterior of the electronic device 101. In an embodiment, the first surface 10 may include a flat surface and/or a curved surface.

In an embodiment, the second surface 20 of the housing 240 may extend from the first surface 10. In an embodiment, the second surface 20 may be exposed to the exterior of the electronic device 101. In an embodiment, the second surface 20 may be visible from the exterior of the electronic device 101. In an embodiment, the second surface 20 may include a curved surface. For example, the curved surface of the second surface 20 may have one curved surface having a single curvature, or a plurality of curved surfaces having different curvatures. In another embodiment, the second surface 20 may include a curved surface and a flat surface or a flat surface. In an embodiment, the second surface 20 may correspond to at least a portion of the side surface 110C of FIG. 1A.

In an embodiment, the first surface 10 and the second surface 20 may include different surface roughness levels. For example, the surface roughness of the first surface 10 may be greater than the surface roughness of the second surface 20.

In an embodiment, the first surface 10 and the second surface 20 may include different surface glossiness levels. For example, the glossiness of the first surface 10 may be lower than the glossiness of the second surface 20. For example, the glossiness of the first surface 10 may be 450 GU or less, and the glossiness of the second surface 20 may be 500 GU or more, but the disclosure is not limited thereto.

In an embodiment, the window 220 may include a front surface 220A, a rear surface 220B, and a side surface 220C.

In an embodiment, the front surface 220A of the window 220 may face a first direction (e.g., the +Z direction). The first direction may be a direction facing towards an exterior of the electronic device 101 with respect to the window 220. In an embodiment, the front surface 220A of the window 220 may correspond to the front surface 110A of FIG. 1A. For example, the front surface 220A of the window 220 may include the front surface 110A and the first areas 110D of FIG. 1A. As another example, the front surface 220A of the window 220 may include the front surface 110A of FIG. 1A.

In an embodiment, the rear surface 220B of the window 220 may face a second direction (e.g., the −Z direction) that is different from the first direction. For example, the front surface 220A and the rear surface 220B of the window 220 may face opposite directions. The second direction may be a direction that faces towards an interior of the electronic device 101 with respect to the window 220.

In an embodiment, the side surface 220C of the window 220 may connect the front surface 220A and the rear surface 220B. For example, the side surface 220C of the window 220 may extend from an edge of the front surface 220A to an edge of the rear surface 220B. In an embodiment, the side surface 220C of the window 220 may surround a space between the front surface 220A and the rear surface 220B.

In an embodiment, when the window 220 is viewed from the −Z direction, the side surface 220C of the window 220 may at least partially overlap the first surface 10 of the housing 240. In an embodiment, the side surface 220C of the window 220 may at least partially face the first surface 10 of the housing 240. In an embodiment, the side surface 220C of the window 220 may or may not at least partially face the second surface 20 of the housing 240.

In an embodiment, the light shielding layer 222 (e.g., the light shielding layer 122 of FIG. 1C) may be disposed on the rear surface 220B of the window 220. In an embodiment, the light shielding layer 222 may be formed by printing of a light shielding ink, attachment of a light shielding film, or application of a light-shielding coating liquid, but the disclosure is not limited thereto. For example, various structures, materials, or methods that may applied to implement the light shielding layer 222.

Although not illustrated, a display (e.g., the display 130 of FIG. 1C) may be disposed between the window 220 and the housing 240. For example, the display may be at least partially spaced apart from the side surface 220C of the window 220, and may be attached to the rear surface 220B of the window 220. The light emitted from the display may be transmitted to the housing 240 through reflection and/or refraction in the window 220. For example, the light emitted from the display may be input to the second surface 20 of the housing 240 through the window 220 as in a first path '1'. The light input to the housing 240 may travel through an aperture between the window 220 and the housing 240. For example, the light input to the second surface 20 may travel through an aperture '3' between the window 220 and the housing 240 as in a second path '2'. As a consequence, light leakage may occur. The light leakage may be visible to the user from the exterior of the electronic device 101. The light shielding layer 222 may be disposed on the rear surface 220B of the window 220, but it may be difficult to prevent a light leakage through a section (e.g., the side surface 220C of the window 220), where the light shielding layer 222 is not disposed.

In an embodiment, because the first surface 10 of the housing 240 has a higher surface roughness and a lower glossiness than those of the second surface 20, it is possible to prevent or alleviate reflection of the light input to the first surface 10 through the window 220. Through this, the first surface 10 of the housing 240 according to an embodiment may prevent light from leaking through a gap between the window 220 and the housing 240. In an embodiment, the first surface 10 of the housing 240 may prevent the light generated in the interior of the electronic device 101, as well as the light emitted from the display and delivered through the window 220, from being reflected and thus leaked to the exterior environment.

In an embodiment, the second surface 20 of the housing 240, which is exposed to the exterior of the electronic device 101, has a surface roughness that is lower than that of the first surface 10, and a glossiness that is higher than that of the first surface 10, and may thus provide a pleasing aesthetic, such as a glossy visual or tactile impression.

Figure 3:
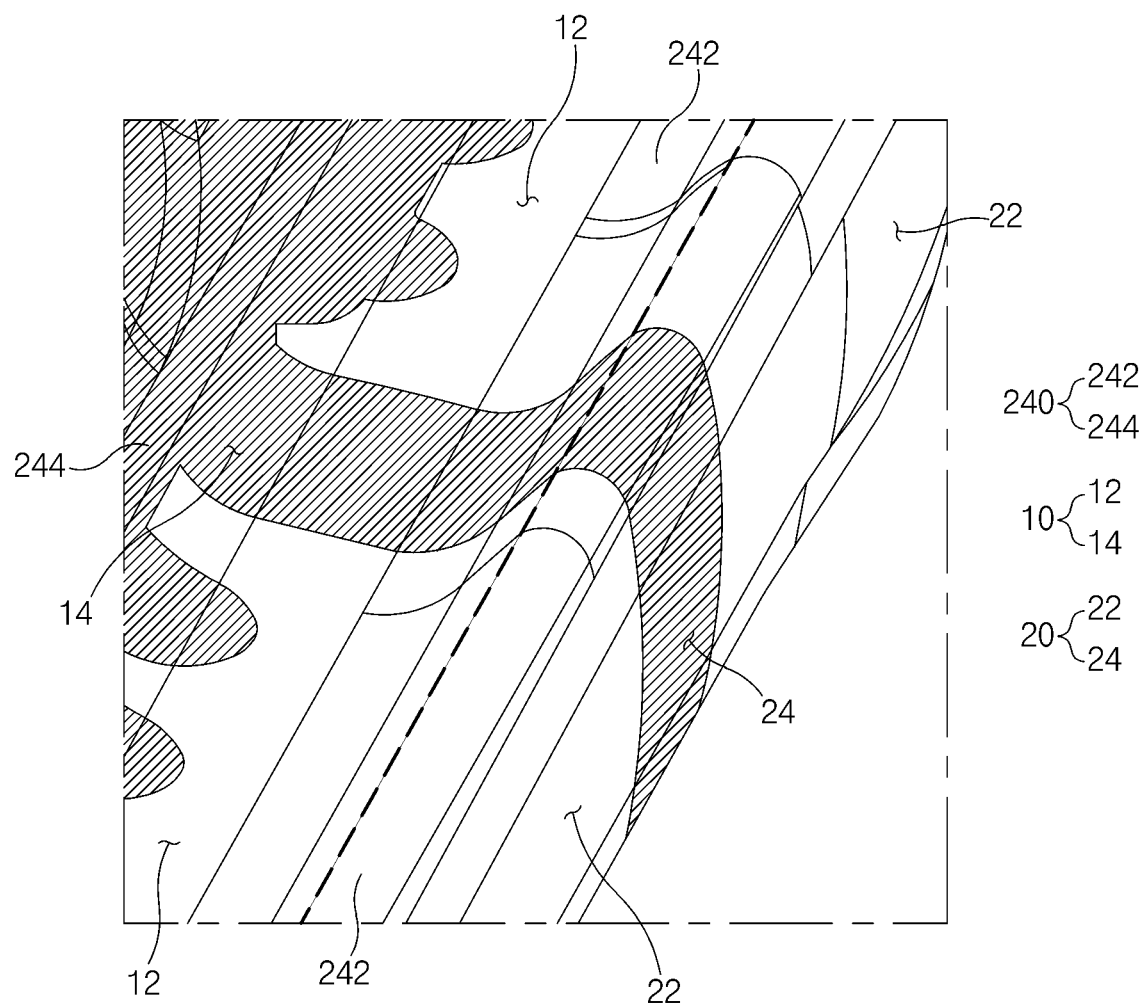
FIG. 3 is a view illustrating a housing corresponding to area B of FIG. 1A.

FIG. 3 is a view illustrating a housing corresponding to area B of FIG. 1A.

Figure 4:
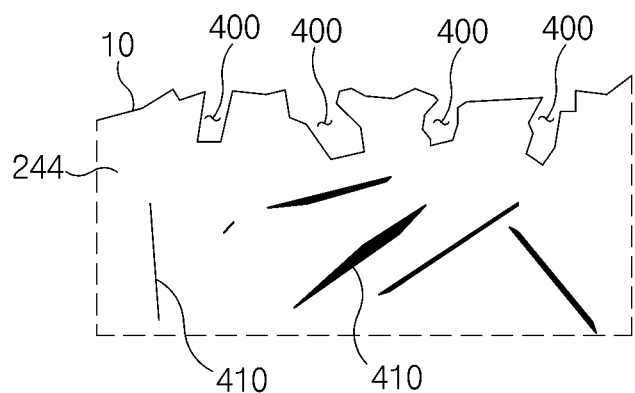
FIG. 4 is a cross-sectional view illustrating a nonconductive part and a first surface of the nonconductive part according to an embodiment.

FIG. 4 is a cross-sectional view illustrating a nonconductive part and a first surface of the nonconductive part according to an embodiment.

In FIGS. 3 and 4, a repeated description of configurations having the same reference numerals as the above-described configurations will be omitted.

Referring to FIG. 3, the housing 240 according to an embodiment may include a conductive part 242 and a nonconductive part 244 surrounded by the conductive part 242.

In an embodiment, the conductive part 242 and the nonconductive part 244 may together define the first surface 10 of the housing 240. For example, the first surface 10 of the housing 240 may include a sub-portion or surface 12 defined by the conductive part 242 and a sub-portion or surface 14 defined by the nonconductive part 244. Hereinafter, the surface 12 may be referred to as the first surface 10 (or the first surface 10 of the conductive part 242) defined by the conductive part 242, and the surface 14 is referred to as the first surface 10 (or the first surface 10 of the nonconductive part 244) defined by the nonconductive part 244.

In an embodiment, the conductive part 242 and the nonconductive part 244 may together define the second surface 20 of the housing 240. For example, the second surface 20 of the housing 240 may include a sub-portion or surface 22 defined by the conductive part 242 and a sub-portion surface 24 defined by the nonconductive part 244. Hereinafter, the surface 22 may be referred to as the second surface 20 (or the second surface 20 of the conductive part 242) defined by the conductive part 242, and the surface 24 is referred to as the second surface 20 (or the second surface 20 of the nonconductive part 244) defined by the nonconductive part 244.

In an embodiment, the conductive part 242 may include a metal. For example, the conductive part 242 may include a metal, such as one or more of aluminum (or an aluminum alloy), magnesium (or a magnesium alloy), or titanium (or a titanium alloy), which may be anodized, but the disclosure is not limited thereto. Although anodizing has been described herein as one example of surface treatment of the conductive part 242, it is understood that the conductive part 242 does not necessarily have to include a metal that may be anodized. For example, the conductive part 242 may include a metal that is not be easily anodized, and in this case, optionally or alternatively, various surface treatment processes may be applied to improve certain desirable characteristics (e.g., an anti-corrosion property) of the conductive part 242.

In an embodiment, an oxide film (not illustrated) (e.g., the oxide films 610 and 720 of FIG. 7) of a metal included in the conductive part 242 may be formed on the first surface 10 and the second surface 20 of the conductive part 242. A thickness of the oxide film may be about 5 µm or more, but the disclosure is not limited thereto. In an embodiment, the oxide film formed on the first surface 10 and the second surface 20 of the conductive part 242 may enhance an anti-corrosion property and an anti-wear property of the conductive part 242.

In an embodiment, the nonconductive part 244 may include a resin. For example, the nonconductive part 244 may include polyetheretherketone (PEEK), polyphenylene sulfide (PPS), polybutylene terephthalate (PBT), polyimide (PI), polycarbonate (PC), or a combination thereof, but the disclosure is not limited to the above-described examples.

In an embodiment, the first surface 10 of the conductive part 242 may have a surface roughness that is different from that of the second surface 20 of the conductive part 242. For example, the first surface 10 of the conductive part 242 may have a surface roughness that is higher than that of the second surface 20 of the conductive part 242.

In an embodiment, the first surface 10 of the conductive part 242 may have a glossiness that is different from that of the second surface 20 of the conductive part 242. For example, the first surface 10 of the conductive part 242 may have a glossiness that is lower than that of the second surface 20 of the conductive part 242.

In an embodiment, the first surface 10 of the nonconductive part 244 may have a surface roughness that is different from that of the second surface 20 of the nonconductive part 244. For example, the first surface 10 of the nonconductive part 244 may have a surface roughness that is higher than that of the second surface 20 of the nonconductive part 244.

In an embodiment, the first surface 10 of the nonconductive part 244 may have a glossiness that is different from that of the second surface 20 of the nonconductive part 244. For example, the first surface 10 of the nonconductive part 244 may have a glossiness that is lower than that of the second surface 20 of the nonconductive part 244.

In an embodiment, the first surface 10 of the conductive part 242 and the first surface 10 of the nonconductive part 244 may have surface roughness levels and glossiness levels that are substantially the same or similar.

In an embodiment, the second surface 20 of the conductive part 242 and the second surface 20 of the nonconductive part 244 may have surface roughness levels and glossiness levels that are substantially the same or similar.

Referring to FIG. 4, in an embodiment, glass fibers 410 may be interposed throughout the nonconductive part 244 to increase strength of the housing 240. In this case, a plurality of pits 400 may be formed on the first surface 10 of the nonconductive part 244 by separating the glass fibers 410. In an embodiment, the first surface 10 of the nonconductive part 244 may have a surface roughness that is higher than that of the second surface 20 due to the plurality of pits 400. However, the disclosure is not limited to the case, and in some embodiments, the nonconductive part 244 may include the glass fiber 410 or the plurality of pits 400 formed on the first surface 10 of the nonconductive part 244, to increase the surface roughness of the first surface 10 defined by the nonconductive part 244. In another embodiment, regardless of the glass fibers 410, when the nonconductive part 244 includes a resin material of a low anti-chemical property, the first surface 10 of the nonconductive part 244 may be formed to have a surface roughness that is higher than that of the second surface 20, through a surface treatment directed to that purpose, such as via chemical etching.

An electronic device (e.g., the electronic device 101 of FIG. 1A) according to certain embodiments may include a window (e.g., the window 220 of FIG. 2) including a front surface (e.g., the front surface 220A of FIG. 2) facing an outer surface of the electronic device, a rear surface (e.g., the rear surface 220B of FIG. 2) facing an opposite direction to the front surface, and a side surface (e.g., the side surface 220C of FIG. 2) extending from an edge of the front surface to an edge of the rear surface, a housing (e.g., the housing 240 of FIG. 2), in which the window is seated, and a display (e.g., the display 130 of FIG. 1C) disposed between the window and the housing, the housing may include a first surface (e.g., the first surface 10 of FIG. 2) covered by the window, a second surface (e.g., the second surface 20 of FIG. 2) extending from the first surface to be viewed from an outside of the electronic device, and a conductive part (e.g., the conductive part 242 of FIG. 3) and a nonconductive part (e.g., the nonconductive part 244 of FIG. 3) defining the first surface and the second surface together, and the first surface and the second surface of the housing may have different glossiness levels.

In an embodiment, the second surface of the housing may have a glossiness that is higher than that of the first surface.

In an embodiment, the first surface and the second surface of the housing may have different surface roughness levels.

In an embodiment, the first surface of the housing may have a surface roughness that is higher than that of the second surface.

In an embodiment, the first surface of the housing may at least partially face the side surface of the window.

In an embodiment, the side surface of the window may at least partially overlap the first surface, when the front surface of the window is viewed.

In an embodiment, the electronic device may further include a light shielding layer (e.g., the light shielding layer 222 of FIG. 2), and the light shielding layer may be disposed on the rear surface of the window.

In an embodiment, the conductive part may include a metal, and an oxide film of the metal is formed on the first surface (e.g., the surface 12 of FIG. 3) and the second surface (e.g., the surface 22 of FIG. 3) defined by the conductive part.

In an embodiment, the metal may include aluminum, magnesium, or titanium.

In an embodiment, the nonconductive part may include a resin.

In an embodiment, the nonconductive part may include a glass fiber interposed in the resin.

In an embodiment, the first surface (e.g., the surface 14 of FIG. 3) defined by the nonconductive part may include a plurality of pits (e.g., the plurality of pits 400 of FIG. 4) formed by separating the glass fiber.

In an embodiment, the window may include glass.

In an embodiment, the first surface (e.g., the surface 12 of FIG. 3) defined by the conductive part may have a surface roughness that is higher than that of the second surface (e.g., the surface 22 of FIG. 3) defined by the conductive part.

In an embodiment, the first surface (e.g., the surface 14 of FIG. 3) defined by the nonconductive part may have a surface roughness that is higher than that of the second surface (e.g., the surface 24 of FIG. 3) defined by the nonconductive part.

In an embodiment, the second surface may include a curved surface.

An electronic device (e.g., the electronic device 101 of FIG. 1A) according to certain embodiments may include a window (e.g., the window 220 of FIG. 2) including a front surface (e.g., the front surface 220A of FIG. 2) facing an outer surface of the electronic device, a rear surface (e.g., the rear surface 220B of FIG. 2) facing an opposite direction to the front surface, and a side surface (e.g., the side surface 220C of FIG. 2) extending from an edge of the front surface to an edge of the rear surface, the window being substantially transparent, a housing (e.g., the housing 240 of FIG. 2) in which the window is seated, a display (e.g., the display 130 of FIG. 1C) located between the window and the housing, and disposed on the rear surface of the window, and a light shielding layer (e.g., the light shielding layer 222 of FIG. 2) at least partially surrounding a periphery of the display, and disposed on the rear surface of the window, the housing may include a first surface (e.g., the first surface 10 of FIG. 2) covered by the window, a second surface (e.g., the second surface 20 of FIG. 2) extending from the first surface to be viewed from an outside of the electronic device, and a conductive part (e.g., the conductive part 242 of FIG. 3) and a nonconductive part (e.g., the nonconductive part 244 of FIG. 3) defining the first surface and the second surface together, and the first surface and the second surface of the housing may have different roughness levels.

In an embodiment, the first surface of the housing may have a surface roughness that is higher than that of the second surface.

In an embodiment, the first surface (e.g., the surface 12 of FIG. 3) defined by the conductive part may have a surface roughness that is higher than that of the second surface (e.g., the surface 22 of FIG. 3) defined by the conductive part, and the first surface (e.g., the surface 14 of FIG. 3) defined by the nonconductive part may have a surface roughness that is higher than that of the second surface (e.g., the surface 24 of FIG. 3) defined by the nonconductive part.

In an embodiment, the first surface of the housing may at least partially face the side surface of the window.

Figure 5:
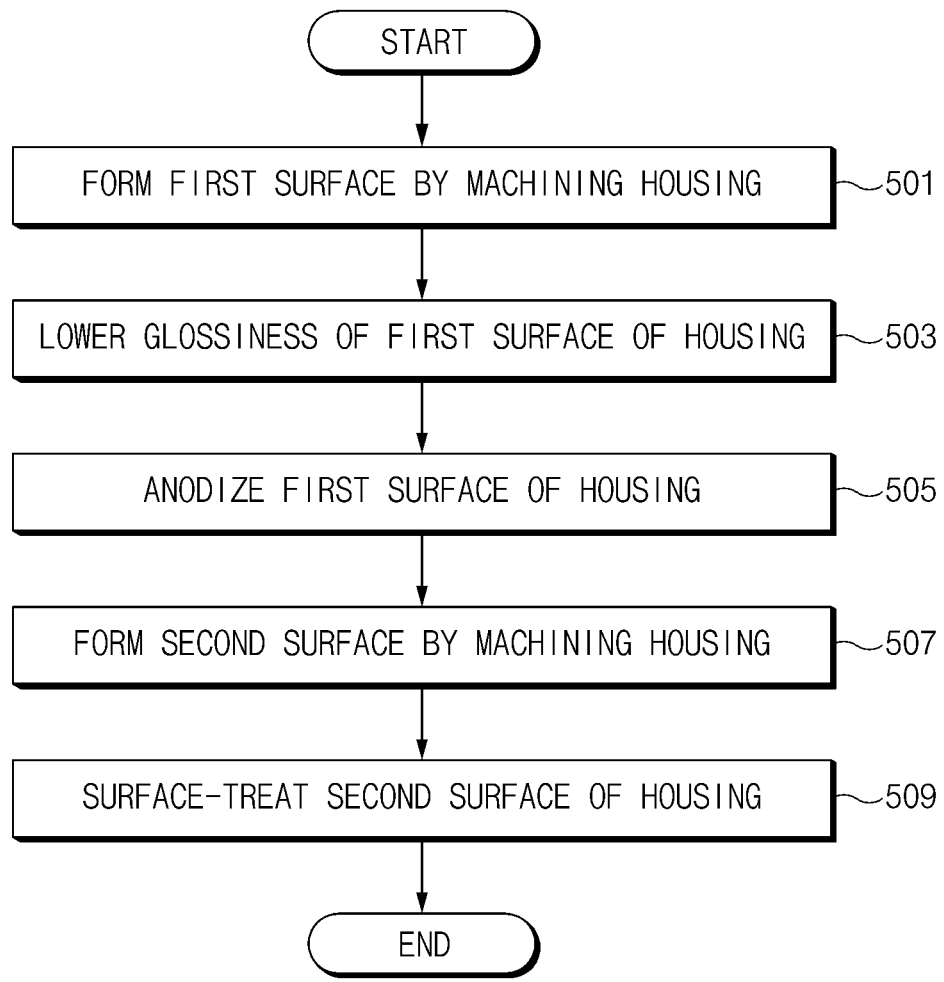
FIG. 5 is a flowchart illustrating a method for manufacturing a housing according to an embodiment.

FIG. 5 is a flowchart illustrating a method for manufacturing a housing according to an embodiment.

Figure 6:
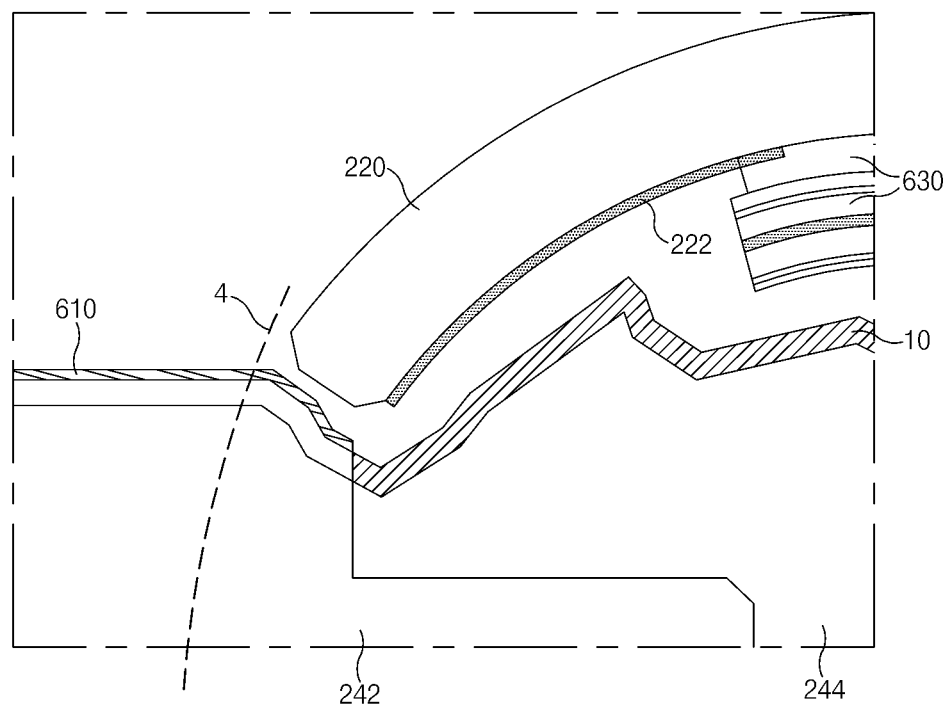
FIG. 6 is a view illustrating a method for manufacturing a housing according to an embodiment.
Figure 7:
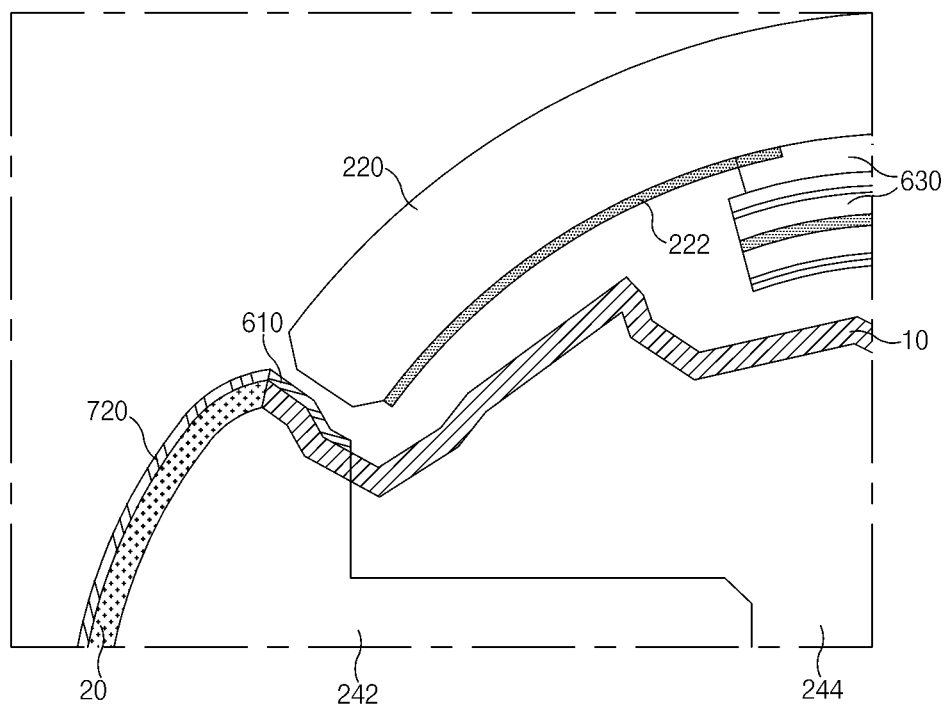
FIG. 7 is a view illustrating a method for manufacturing a housing according to an embodiment.

FIG. 6 is a view illustrating a method for manufacturing a housing according to an embodiment. FIG. 7 is a view illustrating a method for manufacturing a housing according to an embodiment. In FIGS. 6 and 7, it is illustrated that the first surface 10 and the second surface 20 of the housing 240 have specific thicknesses, but this is for convenience of description and the disclosure is not limited thereto. In FIGS. 6 and 7, for convenience of description, the window 220, a display 630, and the light shielding layer 222 are illustrated together with the housing 240.

Referring to FIG. 5, in operation 501, the first surface may be formed by machining the housing. For example, referring to FIG. 6, the first surface 10 may be formed by machining the housing 240 such that the housing 240 has a surface that is configured to face the window 220 and the display 630 (e.g., the display 130 of FIG. 1C) when assembled. The housing 240 may be machined, for example, through a computerized numerical control (CNC) machining process.

In operation 503, a gloss lowering process may be performed on the first surface of the housing. For example, referring to FIG. 6, a chemical etching process may be performed on the first surface 10 of the housing 240 to lower its respective glossiness. For example, the surface roughness of the first surface 10 may be increased and the glossiness of the first surface 10 may be lowered, by applying a corrosive liquid to the first surface 10 of the housing 240. For example, the surface roughness of the first surface 10 of the nonconductive part 244 may be increased by separating glass fibers (e.g., the glass fiber 410 of FIG. 4) on the surface, as described above with reference to FIG. 4, but the disclosure is not limited thereto. The corrosive liquid may include an acid or basic liquid including sodium hydroxide, sulfuric acid, nitric acid, or hydrofluoric acid, and may further include an additional additive. Before the etching process, a cleaning process (e.g., a fat removing process) for removing contaminants on the first surface 10 may be performed, and a neutralization and washing process for removing contamination (e.g., smuts) formed on the first surface 10 may be performed after the etching process.

In operation 505, an anodizing process may be performed on the first surface of the housing. For example, referring to FIG. 6, an oxide film 610 may be formed on the first surface 10 of the conductive part 242 by performing the anodizing process on the first surface 10 of the conductive part 242.

In operation 507, the second surface may be formed by machining the housing. For example, referring to FIGS. 6 and 7, cutting may be performed along a path 'Li,' such that the housing 240 may define a surface exposed to the exterior environment thereof, and through this, the second surface 20 may be formed.

In operation 509, a process of surface-treating the second surface of the housing may be performed. For example, the second surface 20 may be polished such that the second surface 20 of the housing 240 has a surface roughness that is lower than that of the first surface 10 and a glossiness that is higher than that of the first surface 10. For example, buffing, diamond cutting, hair lining, or the like may be performed on the second surface 20 of the housing 240. The above-described process of mechanically polishing the second surface 20 of the housing 240 may be performed together with the cutting process of operation 507. In an embodiment, the anodizing process may be performed after the process of polishing the second surface 20 of the housing 240. An oxide film 720 may be formed on the second surface 20 of the conductive part 242 by performing the anodizing process.

FIG. 8 is a block diagram illustrating an electronic device 801 in a network environment 800 according to certain embodiments.

Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to an embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thererto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to an embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 864 dB or less) for implementing mMTC, or U-plane latency (e.g., 0.5 ms or less for each of downlink (DL) and uplink (UL), or a round trip of 8 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element including a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to certain embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra-low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a window including a front surface facing an outer surface of the electronic device, a rear surface facing an opposite direction to the front surface, and a side surface extending from an edge of the front surface to an edge of the rear surface;
a housing, in which the window is seated; and
a display disposed between the window and the housing, wherein the housing includes:
a first surface covered by the window;
a second surface extending from the first surface that is visible from an exterior of the electronic device; and
a conductive part and a nonconductive part, together defining the first surface and the second surface,
wherein the first surface and the second surface of the housing have different levels of gloss, and
wherein a conductive portion of the first surface defined by the conductive part has a surface roughness that is higher than a surface roughness of a conductive portion of the second surface defined by the conductive part.

2. The electronic device of claim 1, wherein a gloss level of the second surface is higher than a gloss level of the first surface.

3. The electronic device of claim 1, wherein the first surface of the housing is disposed so as to at least partially face the side surface of the window.

4. The electronic device of claim 1, wherein the side surface of the window at least partially overlaps the first surface, when viewed from the front surface of the window.

5. The electronic device of claim 1, further comprising:
a light shielding layer disposed on the rear surface of the window.

6. The electronic device of claim 1, wherein the conductive part includes a metal, and
wherein an oxide film of the metal is formed on portions of the first surface and the second surface that correspond to the conductive part.

7. The electronic device of claim 6, wherein the metal includes at least one of aluminum, magnesium, or titanium.

8. The electronic device of claim 1, wherein the nonconductive part includes a resin.

9. The electronic device of claim 8, wherein the nonconductive part further includes a glass fiber interposed with the resin.

10. The electronic device of claim 9, wherein a nonconductive portion of the first surface defined by the nonconductive part includes a plurality of pits formed by separating portions of the glass fiber.

11. The electronic device of claim 1, wherein the window includes glass.

12. The electronic device of claim 1, wherein the second surface includes a curved surface.

13. An electronic device comprising:
a window;
a housing, in which the window is seated; and
a display disposed between the window and the housing,
wherein the housing includes:
a first surface covered by the window;
a second surface extending from the first surface that is visible from an exterior of the electronic device; and
a conductive part and a nonconductive part. together defining the first surface and the second surface,
wherein the first surface and the second surface of the housing have different levels of gloss, and
wherein a nonconductive portion of the first surface defined by the nonconductive part has a surface roughness that is higher than a surface roughness of a nonconductive portion of the second surface defined by the nonconductive part.

14. An electronic device, comprising:
a window including a front surface facing an outer surface of the electronic device, a rear surface facing an opposite direction to the front surface, and a side surface extending from an edge of the front surface to an edge of the rear surface, the window being substantially transparent;
a housing in which the window is seated;
a display disposed between the window and the housing, on the rear surface of the window; and
a light shielding layer at least partially surrounding a periphery of the display, and disposed on the rear surface of the window,
wherein the housing includes:
a first surface covered by the window;
a second surface extending from the first surface so as to be visible from an exterior of the electronic device; and
a conductive part and a nonconductive part together defining the first surface and the second surface,
wherein a conductive portion of the first surface defined by the conductive part has a surface roughness that is higher than a surface roughness of a conductive portion of the second surface defined by the conductive part, and
wherein a nonconductive portion of the first surface defined by the nonconductive part has a surface roughness that is higher than a surface roughness of a nonconductive portion of the second surface defined by the nonconductive part.

15. The electronic device of claim 14, wherein the first surface of the housing at least partially faces the side surface of the window.

* * * * *